Aug. 28, 1923.
T. COLEMAN, JR
1,466,640
MOLD
Filed April 14, 1922
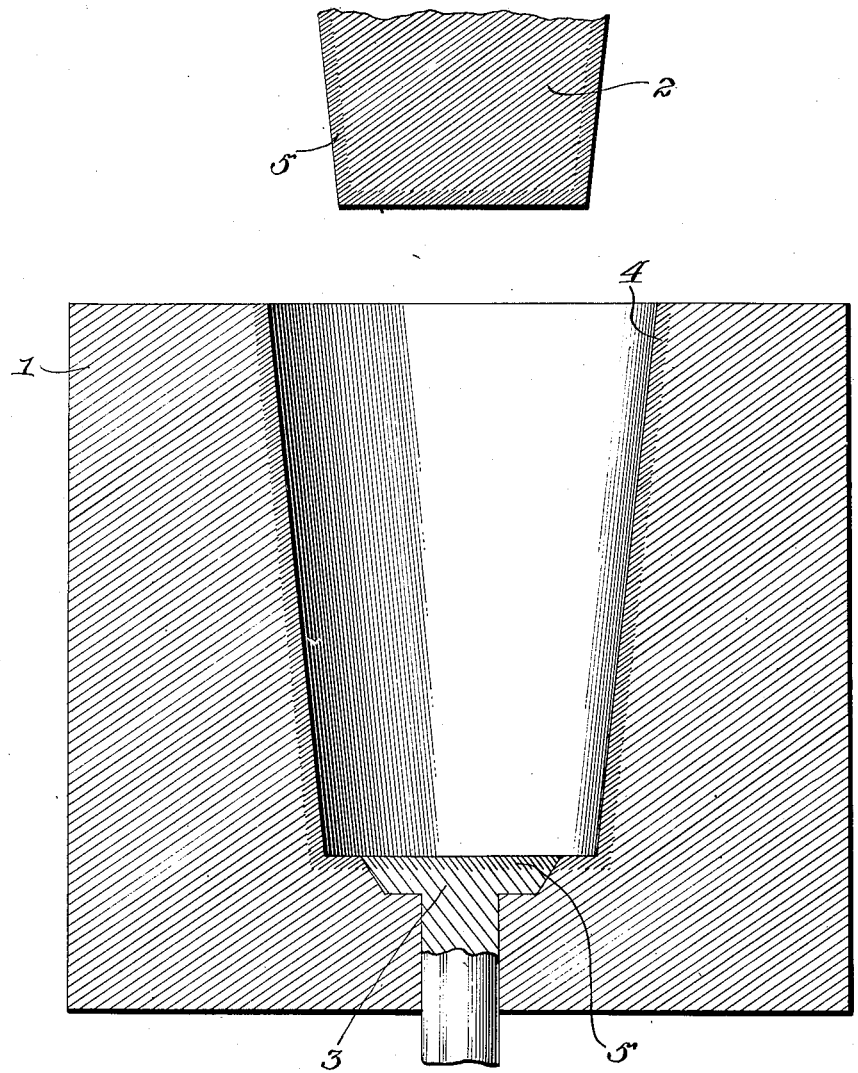
Inventor
Thomas Coleman Jr.
Eccleston & Eccleston
Attorneys Patented Aug. 28, 1923.

1,466,640

UNITED STATES PATENT OFFICE.

THOMAS COLEMAN, JR., OF CLARKSBURG, WEST VIRGINIA, ASSIGNOR TO HAZEL-ATLAS GLASS COMPANY, OF WHEELING, WEST VIRGINIA, A CORPORATION OF WEST VIRGINIA.

MOLD.

Application filed April 14, 1922. Serial No. 552,636.

*To all whom it may concern:*

Be it known that I, THOMAS COLEMAN, Jr., a citizen of the United States, and a resident of Clarksburg, in the county of Harrison and State of West Virginia, have invented certain new and useful Improvements in Molds, of which the following is a full, clear, and exact description.

My invention relates to molds and the associated elements, and more particularly to molds used in the manufacture of glass articles or for other purposes in which the molds are subjected to relatively high temperatures.

One of the objects of my invention is to provide a mold and the elements associated therewith so constructed that the portions thereof subjected to the heat of the molten glass will not become oxidized.

Another purpose of the invention is to provide a mold of the above described character which may be manufactured at a cost to render the mold practical in the glass making art.

In the molding of glass articles the relatively high temperature of the molten glass causes a rapid oxidation of the molds and the associated elements coming into contact with the glass. As a result of this oxidation it is frequently necessary to remove the scale thus formed, and the cleansing process is slow and laborious. The method commonly employed at present consists in scraping the mold with a hard stone to loosen and remove the scale. The molds are often scratched during the cleansing process and are thereby rendered useless. Further, the frequent cleansings to which the molds are necessarily subjected result in the gradual deformation and enlargement of the molds, thereby rendering them useless. Also, as the molds must be cleansed frequently, it is necessary to keep in stock a large number of all the various patterns employed.

By the use of the invention described herein all of the above and numerous other serious objections are eliminated.

The invention is in no way limited to any particular form or type of mold, and the accompanying drawings are, therefore, to be considered merely as illustrative.

In the drawings:

The figure represents a vertical section through a mold and the associated plungers, the latter being fragmentary.

Referring to the drawings more in detail, numeral 1 indicates generally a conventional mold used in the glass making art; and numerals 2 and 3 indicate the plungers associated therewith.

In accordance with my invention, the interior of the ordinary iron mold is machined out to the desired extent, and a layer of non-oxidizable or relatively non-oxidizable metal, of the requisite thickness, is then welded in the mold, as indicated by numeral 4. Instead of boring out the mold, it will be obvious that it may be found preferable to originally manufacture the mold of such size as to permit the non-oxidizable lining to be welded therein.

It is an essential feature of the invention that the lining of non-oxidizable metal be inseparably connected with the body of the mold, as by welding. If there is not a complete union between the lining and the mold body, the heat will be retained in the mold; but by weld uniting the lining and mold the two become as one and the heat will be radiated in the same manner as in the conventional molds now employed.

The plungers commonly employed in conjunction with glass molds are also subjected to oxidation, and, in accordance with this invention, a layer of non-oxidizable metal is welded to that portion of the plungers coming into contact with the molten glass, as indicated by numerals 5, 5.

For stability and for the maintenance of proper heat conditions the molds are necessarily rather thick and heavy, and consequently it is not practical to employ a mold consisting solely of a relatively thin wall of non-oxidizable metal; and the expense of employing a heavy mold made entirely of non-oxidizable metal would render the same impracticable for general use. Further, if a lining of non-oxidizable metal should be reenforced by having iron or other baser metal cast thereon, or otherwise attached thereto without having a complete and inseparable union between the two parts, the mold is impracticable, for the heat will be retained in the mold. In view of this, it is believed that a mold which will be at once cheap, heavy, non-oxidizable, and maintain the proper heat conditions, can be produced only by uniting the non-oxidizable shaping portion of the mold to the body portion of the mold by a complete and inseparable union, such as by welding, whereby the two parts become as one.

Among the many advantageous results produced by my invention, the following may be mentioned:

The mold may be produced at a cost which will render it practical for ordinary use in the glass making and similar arts.

As cleansing of the molds will be unnecessary, there will be a great saving in mold maintenance, the elimination of practically all labor in cleansing molds, and the production of a brighter and clearer quality of ware.

For the same reason there will be an increased saving in increased production, owing to the fact that it will be unnecessary to stop a continuous operation to clean molds.

There will be no gradual deformation and enlargement of the molds, and no scratching of the molds, whereby they are rendered useless.

The molds will be heavy and stable and will radiate the heat in the same manner as with the ordinary iron molds.

The shaping portion of the molds and associated elements will maintain a high polish at all times, thereby producing bright and clear ware, instead of producing articles having a dead surface, which is the result of molds losing their polish through oxidation.

Under the prior practice it is necessary to keep a large amount of capital tied up in molds, as there must be a considerable number of molds for each pattern produced; but with the cleansing operation eliminated it is obvious that the stock of molds may be greatly reduced.

It will be understood, while my invention is particularly adapted to use in connection with the manufacture of glass articles, it is not limited thereto, and is well adapted to the shaping or molding of any material which is placed into the molds when the material is at a relatively high temperature.

It will also be understood that the invention is in no way limited to any particular shape of the mold, or of the accessories associated therewith; and the drawings are, therefore, to be considered merely as illustrative, and not in any limiting sense.

What I claim as new and desire to secure by Letters Patent is:

1. A mold and associated elements formed of a substantially non-oxidizable metal and a baser metal, the two metals being weld united.

2. A mold and a plunger associated therewith, said mold and plunger being each formed of a substantially non-oxidizable metal and a baser metal, the two metals being weld united.

3. A glass mold including a shaping portion formed of a substantially non-oxidizable metal, and a body portion formed of a baser metal, the portions being weld united.

4. A glass mold and a plunger associated therewith, the portion of the mold and plunger exposed to the molten glass being formed of a non-oxidizable metal, the portion of the mold and plunger not exposed to the molten glass being formed of a baser metal, the two metals being weld united.

5. Glass shaping means including a plunger, the portion of said plunger exposed to the molten glass being formed of a non-oxidizable metal, the portion of said plunger not exposed to the molten glass being formed of a baser metal, the two metals being weld united.

THOMAS COLEMAN, Jr.